(12) United States Patent
Tsutsukawa et al.

(10) Patent No.: US 11,776,114 B2
(45) Date of Patent: Oct. 3, 2023

(54) INFORMATION PROCESSING METHOD AND COMPUTER PROGRAM

(71) Applicant: EIZO Corporation, Hakusan (JP)

(72) Inventors: Kazuki Tsutsukawa, Hakusan (JP); Yusuke Bamba, Hakusan (JP); Nobunari Tabata, Hakusan (JP)

(73) Assignee: EIZO Corporation, Hakusan (JP)

(*) Notice: Subject to any disclaimer, the term of this patent is extended or adjusted under 35 U.S.C. 154(b) by 311 days.

(21) Appl. No.: 17/294,506

(22) PCT Filed: Nov. 6, 2019

(86) PCT No.: PCT/JP2019/043367
§ 371 (c)(1),
(2) Date: May 17, 2021

(87) PCT Pub. No.: WO2020/110629
PCT Pub. Date: Jun. 4, 2020

(65) Prior Publication Data
US 2022/0020135 A1 Jan. 20, 2022

(30) Foreign Application Priority Data

Nov. 28, 2018 (WO) .................. PCT/JP2018/043736

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01); *G06T 2207/30121* (2013.01)

(58) Field of Classification Search
CPC ........... G06T 7/001; G06T 2207/20081; G06T 2207/30121; G06T 7/0014; G01M 11/00; G09G 3/20; G06N 20/00
See application file for complete search history.

(56) References Cited

U.S. PATENT DOCUMENTS

| | | |
|---|---|---|
| 5,305,204 A | 4/1994 | Ohhashi |
| 5,754,693 A | 5/1998 | Takesue et al. |
| | (Continued) | |

FOREIGN PATENT DOCUMENTS

| | | |
|---|---|---|
| CN | 1835054 A | 9/2006 |
| CN | 107566689 A | 1/2018 |
| | (Continued) | |

OTHER PUBLICATIONS

International Search Report dated Jan. 28, 2020 in corresponding International Application No. PCT/JP2019/043367; 6 pages.
(Continued)

*Primary Examiner* — Samir A Ahmed
(74) *Attorney, Agent, or Firm* — Maier & Maier, PLLC

(57) ABSTRACT

An object of the present invention is to provide an information processing method and a computer program that can suppress an increase in inspection time in the manufacturing process of the monitors.
The present invention provides an information processing method comprising: an error calculation step of calculating an error between input image data input to an autoencoder and output image data output from the autoencoder; a similarity calculation step of calculating a similarity between compressed data and reference data based on the compressed data and the reference data, the compressed data being acquired by compressing the input image data in an encoder of the autoencoder; and a determination step of determining whether a display unevenness of the input image data is acceptable based on a relationship between the error and the similarity, the relationship corresponding to a relational expression or a table.

5 Claims, 10 Drawing Sheets

(56) References Cited

U.S. PATENT DOCUMENTS

| | | |
|---|---|---|
| 7,457,458 B1 | 11/2008 | Daniel et al. |
| 2006/0208671 A1 | 9/2006 | Ozaki et al. |
| 2014/0160301 A1 | 6/2014 | Tan et al. |
| 2017/0345140 A1 | 11/2017 | Zhang et al. |
| 2018/0211680 A1* | 7/2018 | Rice .................. G10L 19/26 |
| 2018/0262626 A1 | 9/2018 | Genda |
| 2018/0268297 A1 | 9/2018 | Okazaki et al. |
| 2019/0342564 A1* | 11/2019 | Kurokawa ........... H03K 3/3562 |

FOREIGN PATENT DOCUMENTS

| | | |
|---|---|---|
| EP | 1424672 A1 | 6/2004 |
| JP | H06-295168 A | 10/1994 |
| JP | 2003153274 A | 5/2003 |
| JP | 2005-107155 A | 4/2005 |
| JP | 2010159979 A | 7/2010 |
| JP | 2012-185030 A | 9/2012 |
| JP | 2018-005773 A | 1/2018 |
| JP | 2018-156451 A | 10/2018 |
| WO | 2018/105028 A1 | 6/2018 |

OTHER PUBLICATIONS

Office Action dated Feb. 24, 2021 in corresponding Taiwanese Application No. 108136466; 7 pages.
Hata, Seij, "What is tailor-made engineering for Image Processing Industry?", The Papers of Joint Technical Meeting an Information Processing and Innovative Industrial System, IEEJ, Mar. 25, 2011, IP-11-3 IIS-11-33, pp. 13-16.
Miura, Katsushi et al., "Anomaly Detection by Deep Learning Named 'Sense Learning'", SEI technical review [online], No. 193, Sumitomo Electric Industries, LTD31 Jul. 2018, pp. 12-15.
Shindoh, Tomonori, "Sexy Technology is that automatically detects defective products by unsupervised deep learning, Musashi Seimitsu Industry uses autoencoder for automotive gear inspection", NIKKEI Robotics No. 34, Apr. 10, 2018, pp. 3-8.
Wang, Shiqi, et al., "Subjective and Objective Quality Assessment of Compressed Screen Content Images", IEEE Journal On Emerging and Selected Topics in Circuits and Systems, vol. 6, No. 4, IEEE, Dec. 31, 2016, pp. 532-543.
Office Action dated Mar. 29, 2023, in corresponding Chinese Application No. 201980074677.0, 11 pages.
Cui et al., "Defect classification for tire images using multi-streams convolutional neural networks", Computer Engineering and Design, Mar. 16, 2018, vol. 39, No. 3, pp. 873-879 with English Abstract provided.
Ma et al., "Semantic Feature Extraction and Similarity Computation of Sentences Based on Auto-encoder", School of Computer Science and Engineering, Jun. 2018, vol. 50, No. 2, pp. 86-91 with English Abstract provided.

* cited by examiner

IMAGE DATA AT POINT P1

IMAGE DATA AT POINT P2

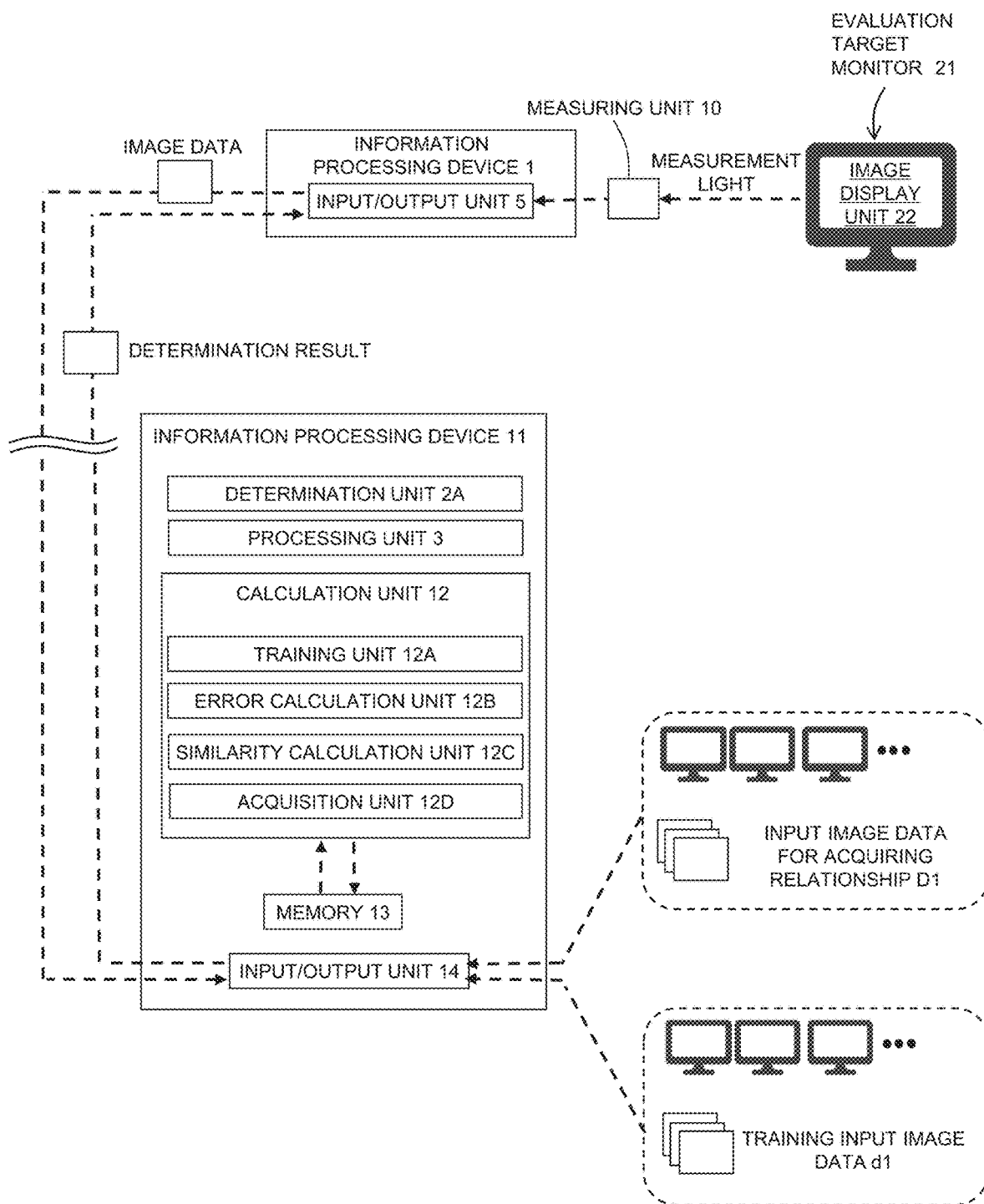

INFORMATION PROCESSING METHOD AND COMPUTER PROGRAM

TECHNICAL FIELD

The present invention relates to an information processing method and a computer program.

BACKGROUND ART

On a display screen of an image display unit of a monitor, for example, the display unevenness may occur due to variations in manufacturing quality. Here, the display unevenness may mean one of the luminance unevenness and the chromaticity unevenness or may mean both the luminance unevenness and the chromaticity unevenness. For example, in a liquid crystal panel, which is the image display unit of an LCD (Liquid Crystal Display) monitor, factors that cause display unevenness include variations in the thickness of the liquid crystal layer, variations in the operating characteristics of the drive transistor, and variations in the emission distribution of the backlight.

In the manufacturing process of monitors, a step for inspecting whether there is the display unevenness of the display screen of the screen display unit or not may be provided after assembling various parts of the monitor (for example, see patent literature 1).

CITATION LIST

Patent Literature

[Patent Literature 1] Japanese Unexamined Patent Application No. 2005-107155

SUMMARY OF INVENTION

Technical Problem

In the conventional manufacturing process of the monitors, the detection of defects such as display unevenness of the image display depends on the experience of the inspector, so there is a problem that the inspection time tends to increase in the conventional manufacturing process of the monitors.

An object of the present invention is to provide a data processing method and a computer program capable of suppressing an increase in inspection time in the manufacturing process of the monitors.

Solution to Problem

The present invention provides an information processing method comprising: an error calculation step of calculating an error between input image data input to an autoencoder and output image data output from the autoencoder; a similarity calculation step of calculating a similarity between compressed data and reference data based on the compressed data and the reference data, the compressed data being acquired by compressing the input image data in an encoder of the autoencoder; and a determination step of determining whether a display unevenness of the input image data is acceptable based on a relationship between the error and the similarity, the relationship corresponding to a relational expression or a table.

In the present invention, in the determination step, it is determined whether the display unevenness is acceptable or not based on the relationship between the above error and the above similarity. First, in the present invention, since it is determined whether the display unevenness is acceptable or not in consideration of the above error, the image data can be classified from the viewpoint based on the level (pixel value) of the display unevenness. Second, in the present invention, since it is determined whether the display unevenness is acceptable or not in consideration of the above similarity, the image data can be classified from the viewpoint based on various display unevenness patterns. Therefore, in the present invention, since it is possible to classify whether display unevenness is acceptable or not from both viewpoints and to promptly determine whether the display unevenness of the image data is acceptable or not, the increase in the inspection time of the monitor is suppressed.

Various embodiments of the present invention are described below. Any of the embodiments described below can be combined with one another.

Preferably, the method further comprising: an acquiring step of calculating a plurality of pairs of an error for acquiring the relationship and a similarity for acquiring the relationship by performing first and second steps for each of a plurality of the input image data, and acquiring the relationship based on the error for acquiring the relationship and the similarity for acquiring the relationship, the first step of calculating the error for acquiring the relationship based on input image data for acquiring the relationship and output image data for acquiring the relationship which is output from the autoencoder, and the second step of calculating the similarity for acquiring the relationship based on compressed data for acquiring the relationship and the reference data, the compressed data for acquiring the relationship being acquired by compressing the input image data for acquiring the relationship in the encoder of the autoencoder.

Preferably, the autoencoder includes the encoder and a decoder, and the autoencoder learns with a learning model bringing training output image data output from the decoder, closer to training input image data input to the encoder, the training input image data is data that the display unevenness is acceptable.

Preferably, the reference data is based on data acquired by compressing the training input image data in the encoder, and in the similarity calculation step, the similarity based on an inner product of the compressed data and the reference data is acquired.

Preferably, the embodiment provides a computer program causing a computer to execute an information processing, the information processing comprising: an error calculation step of calculating an error between input image data input to an autoencoder and output image data output from the autoencoder; a similarity calculation step of calculating a similarity between compressed data and reference data based on the compressed data and the reference data, the compressed data being acquired by compressing the input image data in an encoder of the autoencoder; and a determination step of determining whether a display unevenness of the input image data is acceptable based on a relationship between the error and the similarity, the relationship corresponding to a relational expression or a table.

BRIEF DESCRIPTION OF DRAWINGS

FIG. 10 is a block diagram showing the configuration of the information processing system 100 of the second embodiment.

DESCRIPTION OF EMBODIMENTS

Hereinafter, embodiments of the present invention will be described with reference to the drawings. Any of the embodiments described below can be combined with one another. And the invention is established independently for each feature.

First Embodiment

Figure 1:
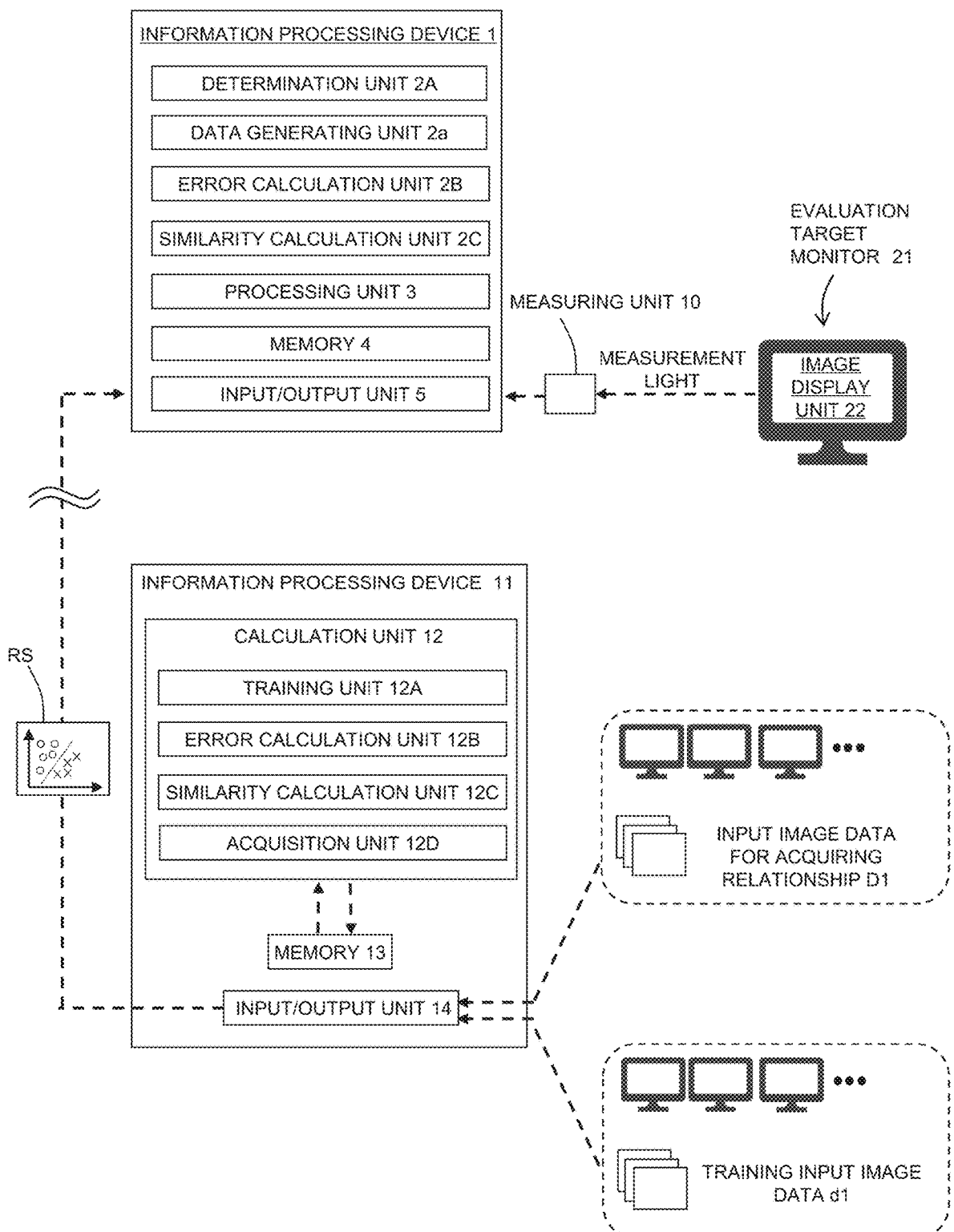
FIG. 1 is a block diagram showing the configuration of the information processing system 100 of the first embodiment.

Based on FIGS. 1 to 8, an information processing system 100 of the first embodiment will be described. As shown in FIG. 1, the information processing system 100 of the present embodiment includes an information processing device 1, an information processing device 11, and a measuring unit 10. The target for which the information processing system 100 evaluates the display unevenness is an evaluation target monitor 21. The information processing device 1 includes a data generation unit 2*a*, a determination unit 2A, an error calculation unit 2B, a similarity calculation unit 2C, a processing unit 3, a memory 4, and an input/output unit 5. The information processing device 11 includes a calculation unit 12, a memory 13, and an input/output unit 14. The calculation unit 12 includes a training unit 12A, an error calculation unit 12B, a similarity calculation unit 12C, and an acquisition unit 12D.

Each of the above components may be realized by software or by hardware. When realized by software, various functions can be realized by the CPU executing the computer program. The program may be stored in a built-in memory or a computer-readable non-transitory storage medium. Further, the program stored in the external the memory may be read and realized by so-called cloud computing. When realized by hardware, it can be realized by various circuits such as ASIC, FPGA, or DRP. The present embodiment deals with various information and concepts encompassing the same, which are represented by high and low signal values as a collection of binary bits consisting of 0 or 1, and communication and arithmetic operations can be performed by the above software or hardware manner 1. Overview of Configuration and Data 1-1. Stages of Learning, Acquiring Relationship and Determination There are three stages in the first embodiment. The first stage is a stage of training, and in the stage of training, the weight coefficients are determined by having an autoencoder, which will be described later, perform machine learning. The second stage is a stage of acquiring a relationship, and in the stage of acquiring the relationship, a relational expression is acquired, which is a reference for determining whether the display unevenness of an image display unit 22 of the evaluation target monitor 21 is acceptable or not. The third stage is a stage of determination, and in the stage of determination, a measurement light is acquired from the evaluation target monitor 21 at the manufacturing site, and it is determined whether the display unevenness of the image display unit 22 of the evaluation target monitor 21 is acceptable or not based on the above reference relational expression. That is, the stage of determination is a stage of inspecting the evaluation target monitor 21 at the manufacturing site.

1-2. About Data Exchanged at Each Stage

Figure 3:
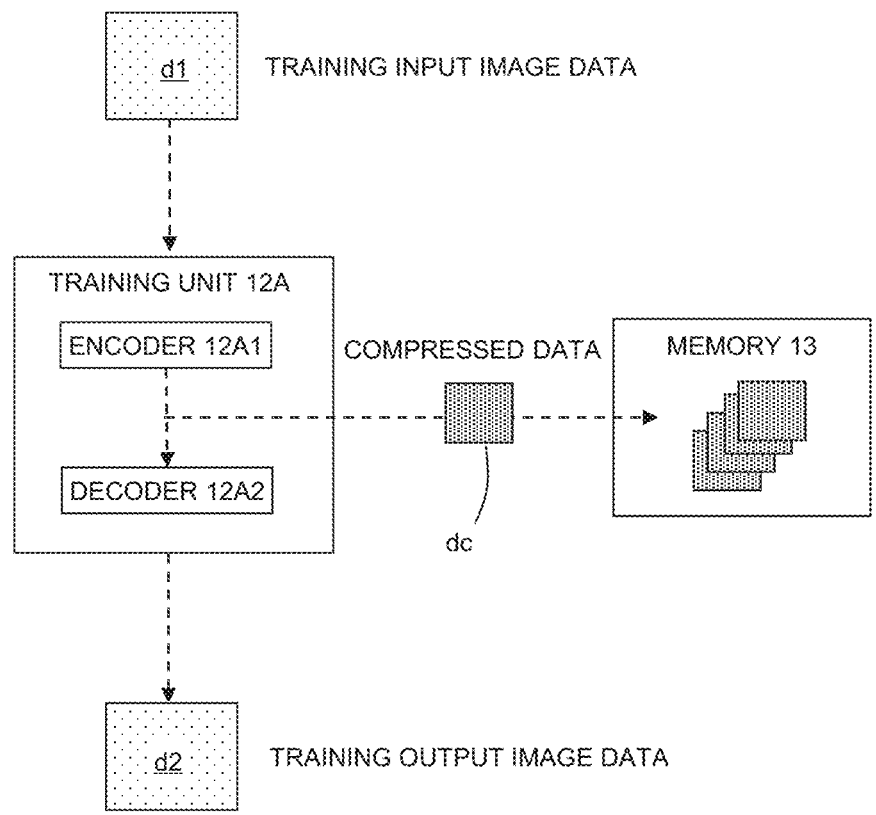
FIG. 3 is a block diagram showing the flow of data on the stage of training.

As shown in FIG. 3, data exchanged in the stage of training includes training input image data d1, training output image data d2, and compressed data dc. All the training input image data d1 are image data pre-classified as the display unevenness is acceptable.

Figure 4:
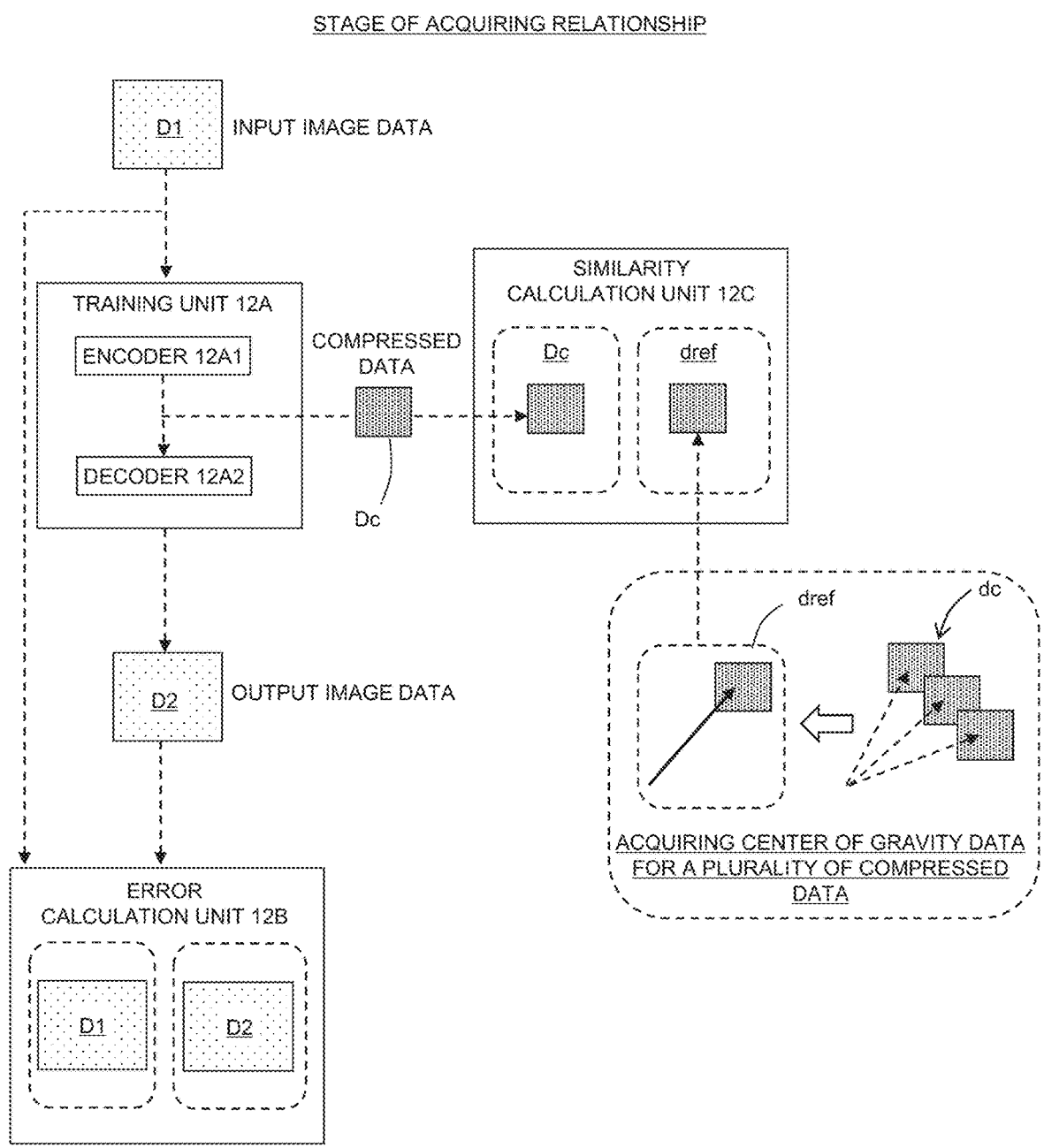
FIG. 4 is a block diagram showing the flow of data on the stage of acquiring the relationship.

As shown in FIG. 4, data exchanged in the stage of acquiring the relationship includes input image data D1 for acquiring the relationship, output image data D2 for acquiring the relationship, and compressed data Dc. The input image data D1 for acquiring the relationship includes not only the image data pre-classified as the display unevenness is acceptable, but also the image data pre-classified as the display unevenness is unacceptable. That is, all the input image data D1 for acquiring the relationship is pre-classified as either the image data to which the display unevenness is acceptable (hereinafter described as the acceptable image data) or the image data to which the display unevenness is unacceptable (hereinafter described as the unacceptable image data). In other words, the input image data D1 for acquiring the relationship has been pre-labeled. That is, all the input image data D1 for acquiring the relationship is pre-labeled as either the acceptable image data or the unacceptable image data.

Figure 6:
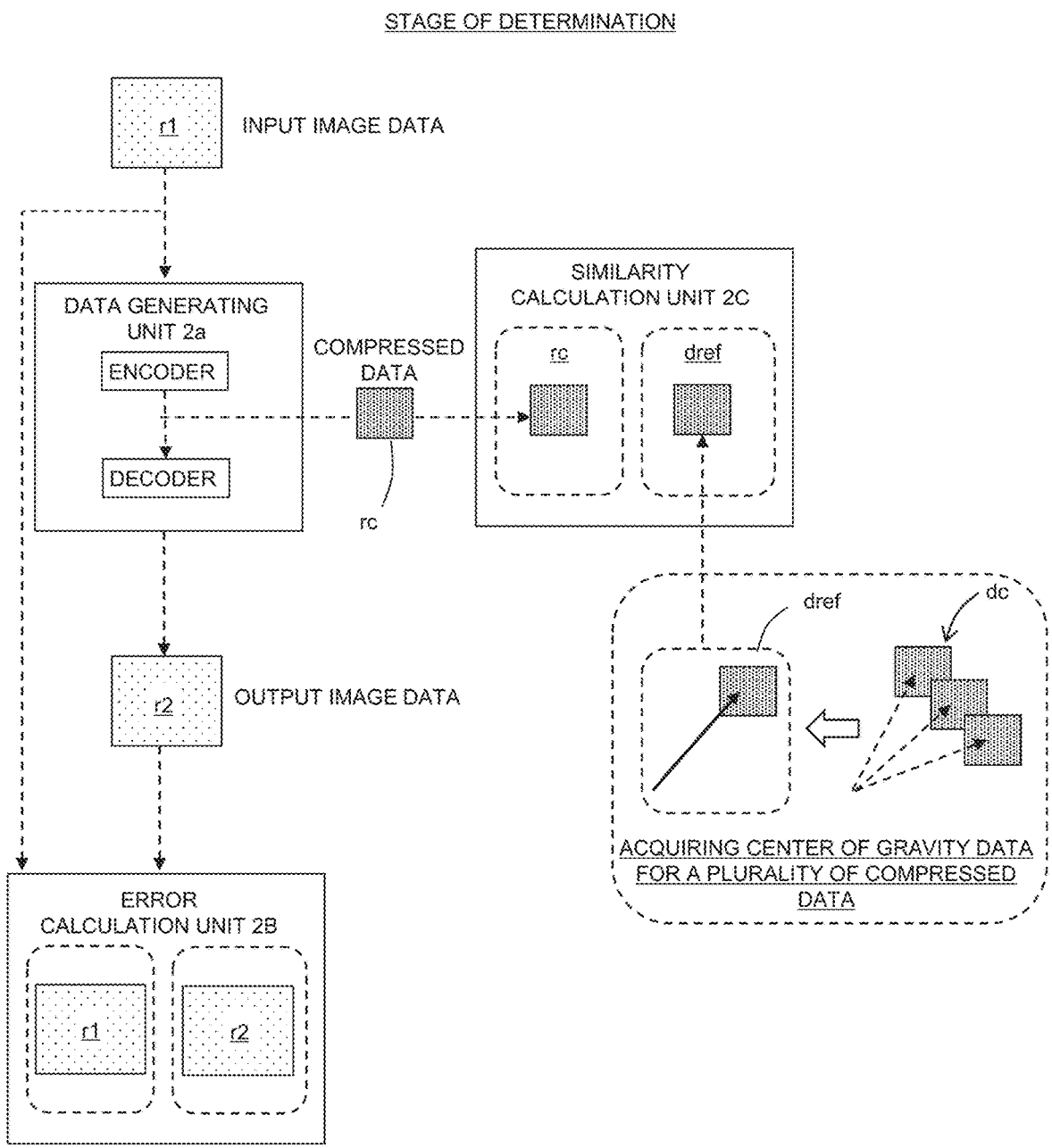
FIG. 6 is a block diagram showing the flow of data on the stage of determination.

As shown in FIG. 6, data exchanged in the stage of determination includes input image data r1, output image data r2, and compressed data rc. The input image data r1 can be acquired from the processing unit 3. The output image data r2 and the compressed data rc are generated in the data generating unit 2*a*.

1-3. Classification Method in Labeling

As described above, the training input image data d1 is the image data pre-classified as the display unevenness is acceptable. Also, the input image data D1 for acquiring the relationship is pre-classified as either the acceptable image data or the unacceptable image data. Here, an example of these classification methods will be described. Image data acquired from an image pickup apparatus is subjected to filtering, etc. described later and is converted into input image data. The display unevenness of the input image data includes dark areas and bright areas adjacent to each other. The boundary portion between the bright area of the input image data and the dark area of the input image data includes a portion where the pixel value is the maximum value and a portion where the pixel value is the minimum value. The input image data is classified into the acceptable image data or the unacceptable image data based on the magnitude of the difference between the maximum value and the minimum value. Specifically, the input image data in which the difference between the maximum value and the minimum value is larger than the threshold value is classified as the unacceptable image data. On the other hand, the input image data in which the difference between the maximum value and the minimum value is smaller than the threshold value is classified as the acceptable image data.

1-4. Filtering, Thresholding, and Changing into Absolute Value

Figure 2:
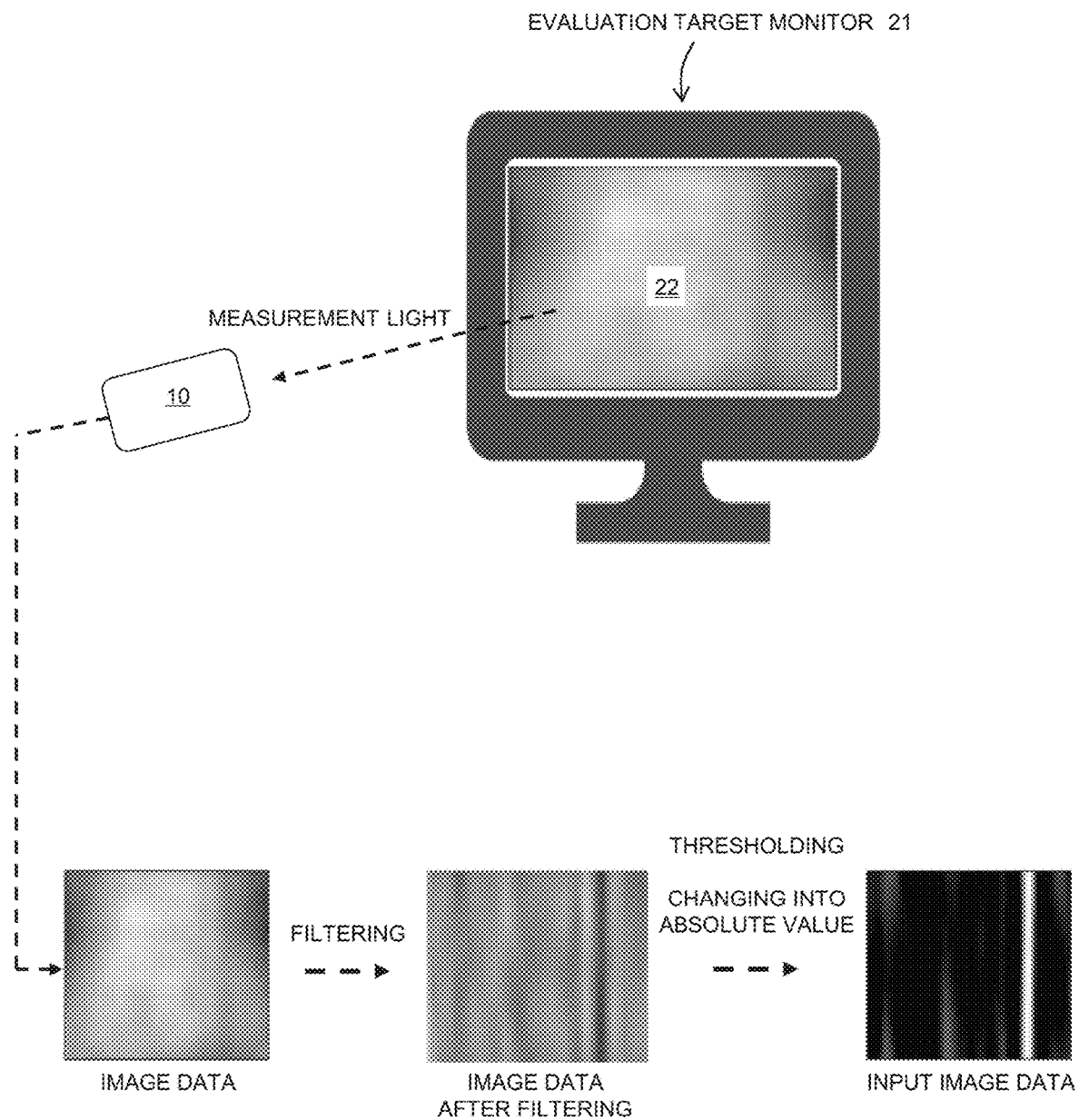
FIG. 2 is an illustration of the filtering and threshold processing applied to the image data acquired by a measuring unit 10.

In the first embodiment, it is not determined whether the display unevenness of the evaluation target monitor 21 is acceptable or not using the pixel value of the image data acquired by the measuring unit 10, but as shown in FIG. 2 it is determined whether the display unevenness of the evaluation target monitor 21 is acceptable or not using the image data that has been subjected to filter processing, thresholding and changing into absolute value. As a result, the characteristic part of the display unevenness can be emphasized, and determination accuracy is improved. It should be noted that the image data does not necessarily have to be subjected to thresholding and changing into absolute value. For example, when analyzing the display unevenness in a specific range of the image data, it is preferable that thresholding and changing into absolute value are performed. On the other hand, when analyzing the display unevenness in the entire range of the image data, the thresholding and changing into absolute value may not be performed. The input image data in the first embodiment includes the training input image data d1, the input image data D1 for acquiring the relationship, and the input image data r1 based on the image data of the evaluation target monitor 21. In the first embodiment, all the input image data are subjected to filter processing, thresholding, and changing into absolute value. The configuration examples of these processes will be described in the configuration of the processing unit 3.

2. Configuration Description 2-1. Measuring Unit 10

As shown in FIG. 2, the measuring unit 10 acquires display unevenness data on the display screen of the image display unit 22 of the evaluation target monitor 21. The measuring unit 10 includes the image pickup apparatus, the measuring unit 10 is directed to the display screen of the image display unit 22 of the evaluation target monitor 21, and the measurement light emitted from the display screen is detected. The detection result by the measuring unit 10 is transmitted to the information processing device 1 as measurement light data. Since this measurement light data includes data indicating the display unevenness of the display screen of the image display unit 22, the measurement light data is included in the display unevenness data.

Here, the display unevenness may mean one of luminance unevenness and chromaticity unevenness or may mean both the luminance unevenness and the chromaticity unevenness. The measurement light data includes data indicating the luminance or chromaticity of the display screen of any gradation. The evaluation target monitor 21 may be, for example, an LCD (Liquid Crystal Display) monitor, an organic EL (Electro Luminescence) monitor, or a PDP (Plasma Display Panel) monitor.

2-2. Information Processing Device 11

The information processing device 11 has a function as a server that controls the information processing device 11. The information processing device 11 includes the calculation unit 12, the memory 13, and the input/output unit 14. The calculation unit 12 includes the training unit 12A, the error calculation unit 12B, the similarity calculation unit 12C, and the acquisition unit 12D. The calculation unit 12 is equipped with a processor unit. For example, the calculation unit 12 is equipped with a GPU (Graphics Processing Unit), which has a high calculation speed.

Figure 5A:
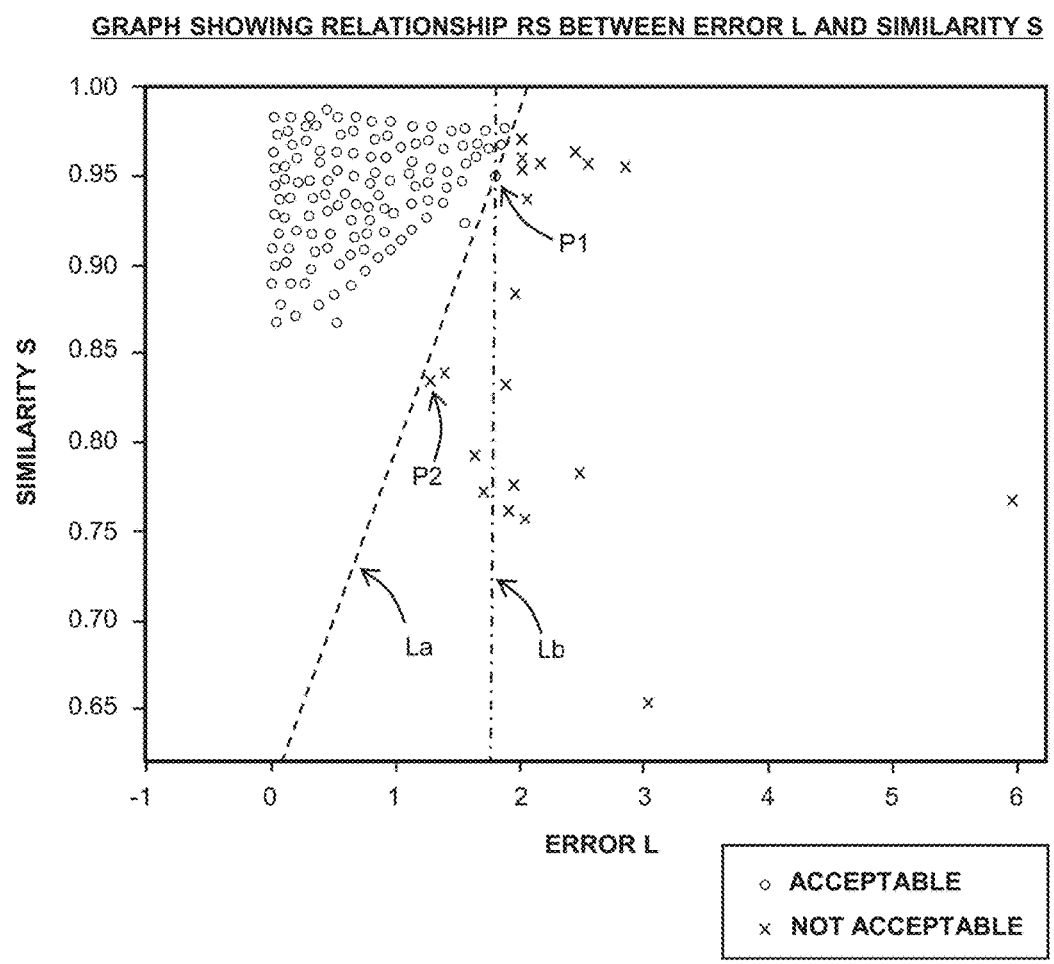
FIG. 5A is a graph showing the relationship RS between error L and similarity S.
Figure 5B:
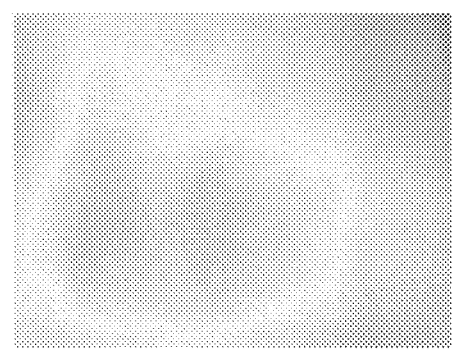
FIG. 5B is image data at point P1 shown in FIG. 5A.
Figure 5C:
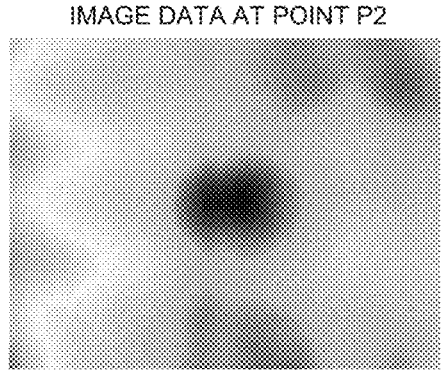
FIG. 5C is image data at point P2 shown in FIG. 5A.

As shown in FIG. 3, the training unit 12A is used in both the stage of training and the stage of acquiring the relationship. On the other hand, as shown in FIG. 4, the error calculation unit 12B, the similarity calculation unit 12C, and the acquisition unit 12D (not shown) are used in the stage of acquiring the relationship. The stage of training is a stage in which the weighting coefficient of the autoencoder of the training unit 12A, which will be described later, is sequentially changed and fixed. The stage of acquiring the relationship is a stage in which the relation RS corresponding to the graph shown in FIG. 5A is acquired using the weighting coefficient determined in the stage of training.

2-2-1. Learning Unit 12A

As shown in FIG. 3, the training unit 12A has a function as the autoencoder, and the training unit 12A includes an encoder 12A1 and a decoder 12A2. As the autoencoder of the training unit 12A, the autoencoder using a fully connected layer may be employed, or the autoencoder using a convolutional layer may be employed. That is, the configuration of the autoencoder of the training unit 12A may be changed as appropriate. In the first embodiment, in addition to the convolutional layer, the autoencoder using the fully connected layer for extracting the similarity is employed. The training unit 12A is configured to output the training output image data d2 when inputting the training input image data d1. Specifically, the training unit 12A learns in advance with a learning model bringing the training output image data d2 closer to the training input image data d1. Here, the training input image data d1 is generated from the image data pre-classified as the display unevenness is acceptable. The training input image data d1 is processed in the same way as the filter processing described in the processing unit 3.

Here, the learning model is a model in which the model is trained using much training data to make the future output predictable. In this embodiment, the input data of the training data is the training input image data d1, and the ground truth data of the training data is the same as the input data of the training data. When much training data are input to the training unit 12A, the weighting coefficients of the encoder 12A1 and the decoder 12A2 are sequentially changed. Then, when the training of the training unit 12A is completed, the weighting coefficient is determined in the training unit 12A. That is, in the training unit 12A, the weighting coefficient is determined in the stage of training described above. After that, in the above-mentioned the stage of acquiring the relationship, the training unit 12A is used to acquire the relationship RS between the error L and the similarity S shown in FIG. 5A. Specifically, when the input image data D1 for acquiring the relationship is input, the training unit 12A outputs the compressed data Dc based on the weighting coefficient determined and outputs the output image data (the output image data D2 for acquiring the relationship) calculated based on the weighting coefficient determined. The error calculation unit 12B and the similarity calculation unit 12C, which will be described below, acquire the above output data.

2-2-2. Error Calculation Unit 12B

As shown in FIG. 4, the error calculation unit 12B calculates the error L between the input image data D1 for acquiring the relationship and the output image data D2 for acquiring the relationship. The error L is calculated based on the difference t between each pixel value of each coordinate of the input image data D1 for acquiring the relationship and each pixel value of each coordinate of the output image data D2 for acquiring the relationship. In other words, the error L is calculated based on the loss function (input I−output $O)^2$. The input I corresponds to each pixel value of each coordinate of the input image data D1 for acquiring the relationship, and the output O corresponds to each pixel value of each coordinate of the output image data D2 for acquiring the relationship. For example, in the case that the image data has coordinates of y value a×value b (a and b are natural numbers), the error L is expressed by averaging the sum of (the difference t between each coordinate).

2-2-3. Similarity Calculation Unit 12C

As shown in FIG. 4, the similarity calculation unit 12C calculates the similarity between the compressed data dc and reference data dref based on the data compressed by the encoder 12A1 (compressed data dc) and the reference data dref. The similarity here means the cosine similarity. In other words, the similarity calculation unit 12C calculates the similarity based on the inner product of the compressed data dc and the reference data dref. The center of gravity data of the plurality of compressed data dc is used for the reference data dref. In the first embodiment, all the compressed data dc used to generate the reference data dref are generated from the image data pre-classified as the display unevenness is acceptable. In other words, the data that compressed the training input image data d1 (the compressed data dc) is used to generate the reference data dref. While the training unit 12A is in the process of training, the weighting coefficient changes sequentially. That is, if the compressed data dc to be acquired is used for the calculation of the center of gravity data while the training unit 12A is in the process of training, the appropriateness of the reference data dref as a reference may be impaired. Therefore, the compressed data dc used when acquiring the center of gravity data may be acquired by inputting a plurality of the training input image data d1 into the training unit 12A with the weighting coefficient determined. Further, the compressed data dc is a multidimensional vector, and the center of gravity data is a center of gravity vector of a plurality of the compressed data dc in a group of the image data pre-classified as the display unevenness is acceptable.

In the first embodiment, the similarity is 0 or more and is 1 or less. That is, when calculating the similarity, the inner product of the compressed data dc and the reference data dref is normalized. The closer the similarity is to 1, the more similar the display unevenness pattern of the image data corresponding to the compressed data dc and the display unevenness pattern of the image data corresponding to the reference data dref are. In the first embodiment, the similarity is 0 or more and is 1 or less, but the value is not limited to that and can be changed as appropriate. For example, the autoencoder in the first embodiment employs a configuration in which the encoding result is the output of the ramp function, but when the autoencoder does not employ the ramp function, the similarity is −1 or more and is 1 or less.

2-2-4. Acquisition Unit 12D

The acquisition unit 12D acquires the error calculated by the error calculation unit 12B and the similarity calculated by the similarity calculation unit 12C. By inputting a lot of the input image data for acquiring the relationship into the training unit 12A, the acquisition unit 12D acquires multiple sets of the error and the similarity corresponding to a number of the input image data for acquiring the relationship input to the training unit 12A. FIG. 5A is a graph in which the horizontal axis is the error L and the vertical axis is the similarity S, and the error and the similarity of each set acquired by the acquisition unit 12D are plotted.

As shown in FIG. 5A, the input image data for acquiring the relationship of the display screen pre-classified as the display unevenness is acceptable is distributed on the left side of the area indicated by the line La. The input image data for acquiring the relationship of the display screen pre-classified as the display unevenness is unacceptable is distributed on the right side of the area indicated by the line La. Thus, by plotting the input image data with both the error and the similarity as feature quantity, the unacceptable image data and the acceptable image data can be separated as shown in FIG. 5A. That is, the line La shown in FIG. 5A is the relational expression that classifies into the acceptable image data and the unacceptable image data.

The acquisition unit 12D acquires the relational expression corresponding to this line La. For example, if the line La is a straight line, the acquisition unit 12D acquires the slope and intercept of the line La. The method by which the acquisition unit 12D acquires the slope and intercept of line La may be a method in which a computer (the acquisition unit 12D) calculates based on the plot of each set of the error and the similarity and acquires, and may be a method in which the user makes a decision with reference to the graph shown in FIG. 5A. Likewise, the relational expression corresponding to the line La is not limited to a straight line, and may be, for example, the relational expression represented by a curve. Further, in the first embodiment, the acquisition unit 12D acquires the relational expression corresponding to the line La, but that is not limited thereto, and the acquisition unit 12D may acquire a table that classifies into the acceptable image data and the unacceptable image data according to the error and the similarity.

2-2-5. Memory 13 and Input/Output Unit 14

The memory 13 stores, for example, various parameters, etc. used in the learning model by the training unit 12A. The input/output unit 14 receives the training input image data d1 and the input image data D1 for acquiring the relationship etc., or the input/output unit 14 outputs the relational expression, etc. acquired by the acquisition unit 12D to the information processing device 1.

2-3. Information Processing Device 1

The information processing device 1 includes the data generating unit 2a, the determination unit 2A, the error calculation unit 2B, the similarity calculation unit 2C, the processing unit 3, the memory 4, and the input/output unit 5. For example, the information processing device 1 is placed on the production line at the manufacturing site.

2-3-1. Processing Unit 3

The processing unit 3 executes the filter processing, the thresholding, and the changing into absolute value. As shown in FIG. 2, in the filter processing, a bandpass filter is applied to the image data acquired by the measuring unit 10. For example, when it is desired to make band unevenness or streak unevenness stand out, a filter that passes a spatial frequency corresponding to the width of band unevenness or streak unevenness is applied to the image data acquired by the measuring unit 10. A filter of the filter processing can be determined according to the type of unevenness to be determined.

As shown in FIG. 2, the image data after the filter processing is subjected to the threshold processing. In the threshold processing, a process of converting the pixel value of each coordinate that is within the predetermined threshold range into a constant value and keeping the pixel value of each coordinate of the pixel value outside the threshold range intact is applied. In the changing into absolute value, for example, a process of inverting the light and darkness of the unevenness in the dark area of the display screen and making a display state of the unevenness in the dark area of the display screen and a display state of the unevenness in the bright area of the display screen the same is applied.

2-3-2. Data Generating Unit 2a

The data generating unit 2a also has the corresponding function of the autoencoder explained in learning unit 12A. The data generating unit 2a executes a calculation based on the weighting coefficient determined by the training unit 12A. Specifically, the data generating unit 2a generates the compressed data rc and the output image data r2 using the weighting coefficient determined when the input image data r1 is input from the processing unit 3 to the data generating unit 2a. Thus, the data generating unit 2a does not train the model using a lot of the training data, but the data generating unit 2a generates the compressed data rc and the output image data r2 using the weighting coefficient determined by the training unit 12A.

2-3-3. Error Calculation Unit 2B and Similarity Calculation Unit 2C

The functions of the error calculation unit 2B are the same as those of the error calculation unit 12B. Further, data input to the error calculation unit 12B is, for example, the input image data D1 for acquiring the relationship, the data input to the error calculation unit 2B is data based on the input image data r1. The error calculation unit 2B calculates the error L between the input image data r1 and the output image data r2. The error L is calculated based on the difference t between each pixel value of each coordinate of the input image data r1 and each pixel value of each coordinate of the output image data r2. In other words, the error L is calculated based on the loss function (the input I−the output O)$^2$. The input I corresponds to each pixel value of each coordinate of the input image data r1, and the output O corresponds to each pixel value of each coordinate of the output image data r2.

The functions of the similarity calculation unit 2C are the same as those of the similarity calculation unit 12C. Further, data input to the similarity calculation unit 12C is, for example, the input image data D1 for acquiring the relationship, the data input to the similarity calculation unit 2C is data based on the input image data r1. The similarity calculation unit 2C calculates the similarity between the compressed data rc and the reference data dref based on the data compressed by the encoder of the data generating unit 2a (the compressed data rc) and the reference data dref. That is, the similarity calculation unit 2C calculates the similarity based on the inner product of the compressed data rc and the reference data dref. The reference data dref used by the similarity calculation unit 2C is the same as the reference data dref used by the similarity calculation unit 12C.

2-3-4. Determination Unit 2A

The determination unit 2A determines whether the image data is acceptable or unacceptable for the display unevenness of the display screen of the image display unit 22 based on the relationship RS between the error L and the similarity S. The determination unit 2A acquires the relational expression or the table pre-acquired by the acquisition unit 12D. The determination unit 2A classifies into the acceptable image data or the unacceptable image data based on the error L and the similarity S based on the input image data r1, and the relational expression pre-acquired by the acquisition unit 12D. The error L based on the input image data r1 corresponds to the error L calculated by the error calculation unit 2B, and the similarity S based on the input image data r1 corresponds to the similarity S calculated by the similarity calculation unit 2C.

For example, if the plot positions of the error L and the similarity S based on the input image data r1 are located to the right of the line La shown in FIG. 5A, the input image data r1 is classified as the unacceptable image data. Conversely, if the plot positions of the error L and the similarity S based on the input image data r1 are located to the left of the line La shown in FIG. 5A, the input image data r1 is classified as acceptable image data. The determination unit 2A may output this classification result as a determination result, or the determination unit 2A may finally output the determination result in consideration of another analysis result. Also, the determination unit 2A may output the image data of the plot near the line La as data that the inspector should pay attention to. In the first embodiment, the determination unit 2A outputs this classification result as a determination result. For example, when the determination unit 2A classifies the input image data r1 as the acceptable image data, the determination unit 2A determines that the display unevenness of the input image data r1 is acceptable. For example, the determination result and the classification result by the determination unit 2A are displayed on a monitor (not shown) provided in the information processing device 1.

2-3-5. Memory 4 and Input/Output Unit 5

The memory 4 stores, for example, various parameters, etc. used in the calculation by the data generating unit 2a. The input/output unit 5 receives the input image data from the measuring unit 10. Also, the input/output unit 5 receives the weighting coefficient determined by the training unit 12A, the reference data dref, and the relational expression and the table, etc. pre-acquired by the acquisition unit 12D, from the information processing device 11.

3. Flowchart

Figure 7:
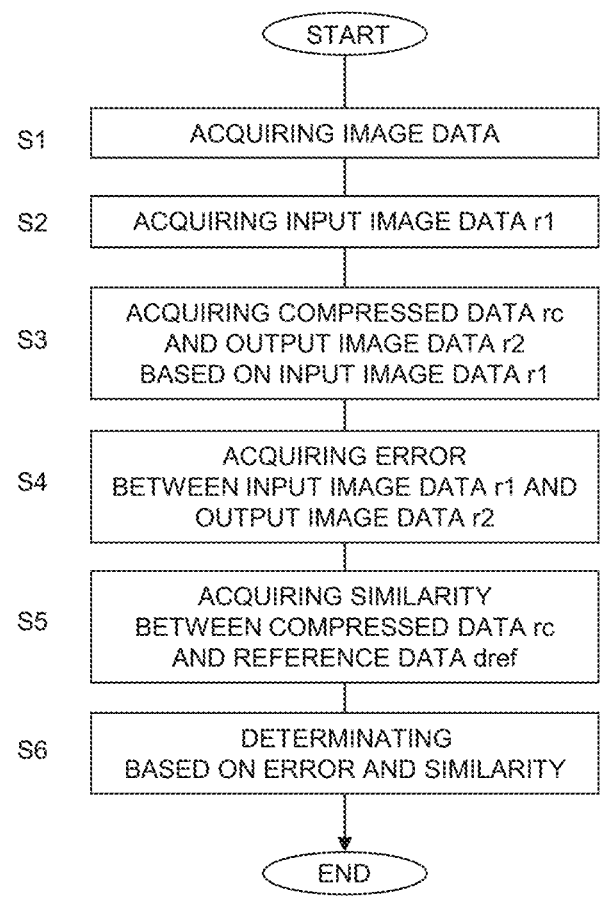
FIG. 7 is an operation flowchart of the information processing system 100 of the first embodiment.

The operation flow of the information processing device 1 is explained based on FIG. 7. The input/output unit 5 of the information processing device 1 acquires the image data of the display screen of the image display unit 22 (step S1). The image data corresponds to the measurement light data acquired by the measuring unit 10 from the display screen of the image display unit 22. The processing unit 3 of the information processing device 1 applies the filter processing, the threshold processing, and the changing into absolute value to the image data, and converts the image data into the input image data r1 (step S2). That is, the processing unit 3 of the information processing device 1 acquires the input image data r1 by converting the image data into the input image data r1.

The data generating unit 2a of the information processing device 1 generates the compressed data rc and the output image data r2 from the input image data r1 (step S3). The error calculation unit 2B of the information processing device 1 calculates the error L based on the input image data r1 and the output image data r2 (step S4). Further, the similarity calculation unit 2C of the information processing device 1 calculates the similarity S based on the compressed data rc and the reference data dref (step S5). Step S4 corresponds to the error calculation step and step S5 corresponds to the similarity calculation step. The order of step S4 and step S5 is not particularly limited. The determination unit 2A of the information processing device 1 determines whether the display unevenness of the input image data r1 is acceptable based on the error L calculated in the step S4, the similarity S calculated in the step S5, and the pre-acquired the relationship RS (the relational expression corresponding to line La shown in FIG. 5A) (step S6). Step S6 corresponds to the determination step.

The determination unit 2A of the information processing device 1 pre-acquires the relationship RS from the acquisition unit 12D of the information processing device 11. The acquisition unit 12D of the information processing device 11 acquires the relationship RS by calculating a plurality of sets of the error L for acquiring the relationship and the similarity S for acquiring the relationship. Specifically, the acquisition unit 12D of the information processing device 11 acquires the relationship RS by executing the first and second steps described below. In the first step, the error L for acquiring the relationship is calculated based on the input image data D1 for acquiring the relationship and the output image data D2 for acquiring the relationship from the training unit 12A. In the second step, the similarity S for acquiring the relationship is calculated based on the compressed data Dc for acquiring the relationship acquired by compressing the input image data D1 for acquiring the relationship with the encoder 12A1 of the training unit 12A and the reference data dref. Thus, the step in which the acquisition unit 12D acquires the relationship RS and the determination unit 2A acquires the relationship RS from the information processing device 11 corresponds to the acquisition step.

4. Effects of First Embodiment

In the first embodiment, since the determination unit 2A of the information processing device 1 automatically determines whether the image data is acceptable or unacceptable for the display unevenness based on the following two viewpoints, the inspection of the evaluation target monitor 21 is performed promptly, and the increase in the inspection time of the evaluation target monitor 21 is suppressed.

In the determination step of the first embodiment, it is determined whether the image data is acceptable or unacceptable for the display unevenness based on the relationship between the error L and the similarity S. Specifically, in the determination step, since it is classified whether the display unevenness is acceptable in consideration of the error L, the image data can be classified from the viewpoint based on the level (pixel value) of the display unevenness. Also, in the determination step, since it is classified whether the display unevenness is acceptable in consideration of the similarity S, the image data can be classified from the viewpoint based on various display unevenness patterns.

For example, when it is classified whether the image data is acceptable or unacceptable for the display unevenness only from the viewpoint based on the level (pixel value) of the display unevenness, all plots shown in FIG. 5A are on the horizontal axis. Here, to emphasize the disadvantage of classifying whether the image data is acceptable or unacceptable for the display unevenness only from the viewpoint based on the level (pixel value) of the display unevenness, the description will be given based on the plot shown in FIG. 5A. When it is determined whether the image data is acceptable or unacceptable for the display unevenness only from the viewpoint based on the level (pixel value) of the display unevenness, the relational expression used for classification is limited to the mode such as the straight line Lb shown in FIG. 5A. Here, the straight line Lb is parallel to the vertical axis. On the left side of this straight line Lb, there is also a plot of the unacceptable image data, therefore, it is clear that using the straight line Lb cannot properly classify into the acceptable image data and the unacceptable image data.

The similarity S represents how close the pattern of the display unevenness of the image data is to the acceptable pattern of the display unevenness. That is, the similarity S is not a parameter that analyzes the image data from the viewpoint of the level of the display unevenness. The parameter that analyzes the image data from the viewpoint of the level of the display unevenness is the error L. This is because the similarity S is normalized, so the similarity does not include data regarding the level of the display unevenness.

If there are two input image data r1 with the same error L but different the similarity S, since the input image data r1 with the higher similarity S has the pattern of the display unevenness similar to acceptable display unevenness, there is a high possibility that display unevenness of the input image data r1 with the higher similarity S is acceptable. Utilizing this property, the relational expression of the determination unit 2A in the first embodiment is set so that the input image data r1 can be easily classified as the acceptable image data when the similarity S is high even if the error L is the same. Also, the relational expression of the determination unit 2A in the first embodiment is set so the input image data r1 can be easily classified as the unacceptable image data when the similarity S is low even if the error L is the same.

In the determination step in the first embodiment, since it is classified whether the display unevenness is acceptable not only from the viewpoint based on the strength (pixel value) of the display unevenness but also from the viewpoint based on various patterns of the display unevenness, the image data is classified more finely. As shown in FIG. 5A, classifying the input image data r1 from both viewpoints means that the relational expression classifying into the acceptable image data and the unacceptable image data can be set on the graph. Therefore, in the determination step in the first embodiment, the accuracy of determining whether the image data is acceptable or unacceptable for the display unevenness is improved.

Also, even when the flowchart as shown in FIG. 7 is applied to a monitor of a different type from the monitor used during training, the same effect as that of the first embodiment can be obtained. That is, it is possible to accurately determine whether the image data is acceptable or unacceptable for the display unevenness. This is because the correlation between the error L and the similarity S of the monitor used during training is similar to the correlation between the error L and the similarity S of a monitor of a different type from the monitor used during training.

5-1. Modification 1

Figure 8:
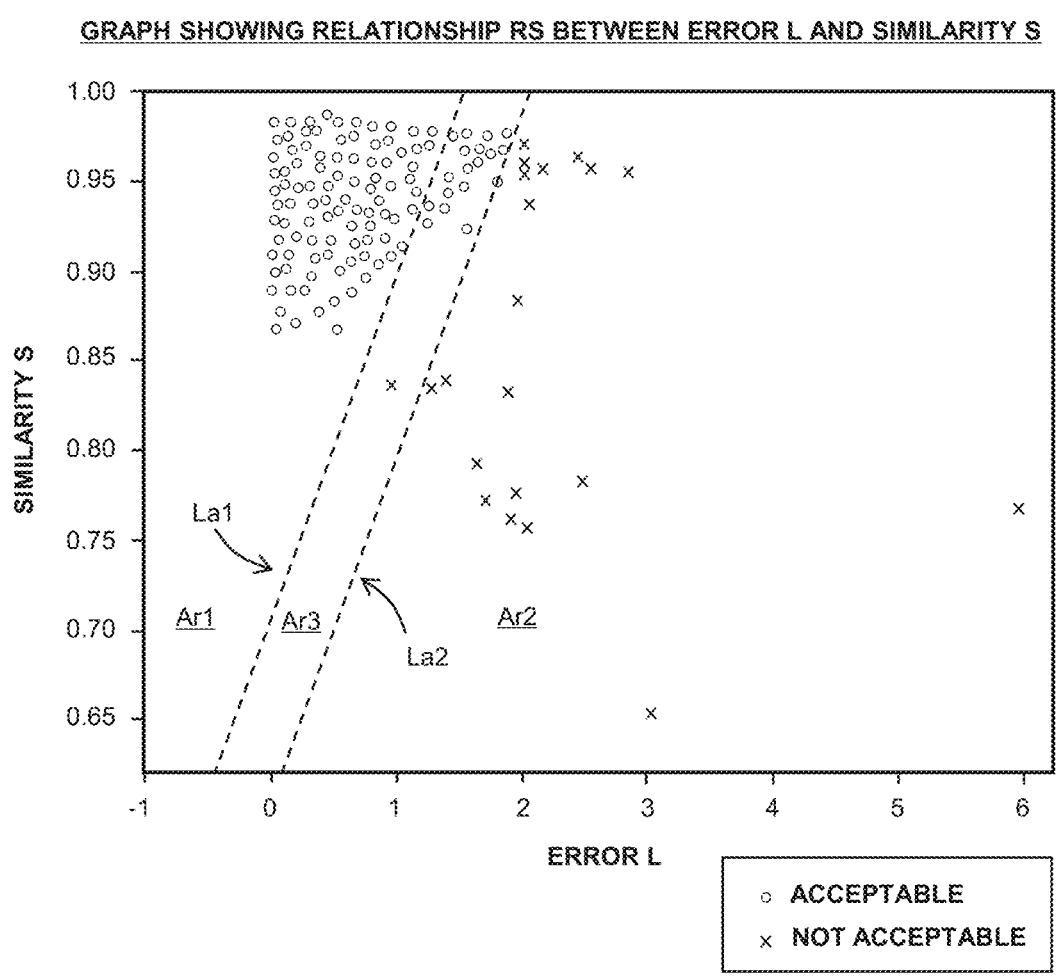
FIG. 8 is a graph showing the relationship RS between the error L and the similarity S for the modification 1 of the first embodiment.

In the first embodiment, the display unevenness is classified into two types, the acceptable image data and the unacceptable image data, but the present invention is not limited thereto. In the modification 1, the display unevenness can be classified into caution data. Specifically, the acquisition unit 12D may acquire the relational expressions corresponding to the line La1 and the line La2 respectively, as shown in FIG. 8. The area Ar1 on the left side of the line La1 is an area of the acceptable image data, the area Ar2 on the right side of the line La2 is an area of the unacceptable image data, and the area Ar3 between the line La1 and the line La2 is an area of the attention data. When the plot of the input image data r1 is located in the area Ar3, the determination result by the determination unit 2A shall be the content to call the inspector's attention. If the boundary between the area where the acceptable image data is mainly distributed and the area where the unacceptable image data is mainly distributed is not clear, as shown in the modification 1, setting a plurality of classification formulas allows the inspector to more accurately and carefully determine whether the display unevenness is acceptable or not. Further, even with the configuration of the modification 1, not all the display unevenness of all the evaluation target monitor 21 are classified into the caution data. That is, even with the configuration of the modification 1, the display unevenness of some of all the evaluation target monitor 21 may be classified into the area Ar1 or the area Ar2. Therefore, even with the configuration of the modification 1, the effect of suppressing the increase in the inspection time of the evaluation target monitor 21 can be obtained.

5-2. Modification 2

Figure 9:
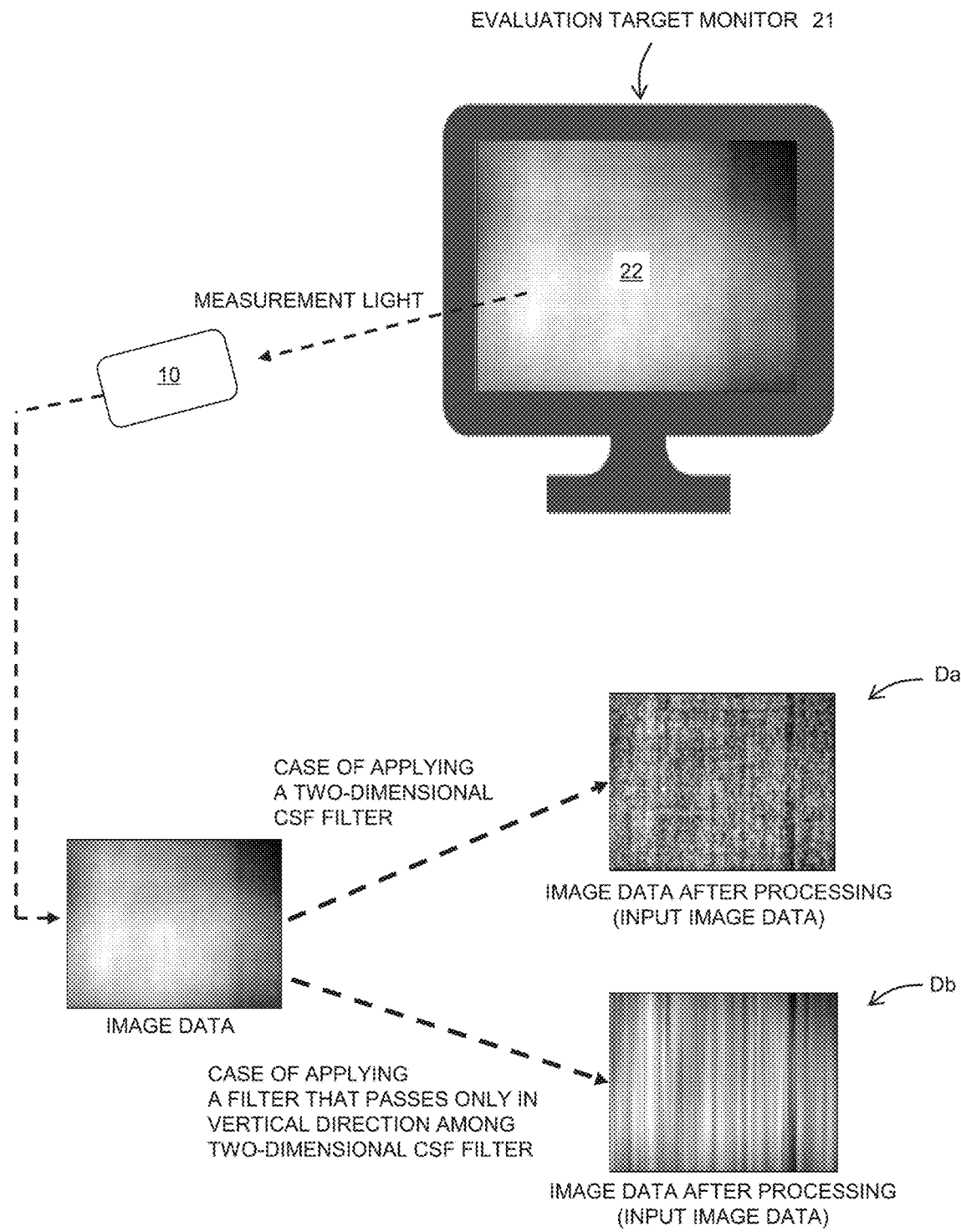
FIG. 9 is an illustration of the filtering for the modification 2 of the first embodiment.

In the modification 2, the Contrast Sensitivity Function (CSF), which models human visual characteristics for the spatial frequency, is applied as the bandpass filter of the processing unit 3. The use of a two-dimensional CSF filter can emphasize the display unevenness according to human visual characteristics. Also, the employment of a configuration in which the two-dimensional CSF filter passes the spatial frequency in a specific direction can emphasize band unevenness and streak unevenness in a specific direction. As shown in FIG. 9, when the two-dimensional CSF filter is applied, processed image data Da is generated from the image data, and when the filter that passes only the vertical direction among the two-dimensional CSF filters is applied, processed image data Db is generated from the image data.

5-3. Modification 3

In the modification 3, the relational expression is determined by a machine learning. For example, the variables used in the relational expression are determined by the machine learning. Specifically, the variables used in the relational expression are determined based on the sum of the distances between at least one of the plots of the labeled acceptable image data and the plots of the unacceptable image data and the curve or the straight line represented by the relational expression. When the distance is calculated, the distance from the plot may be weighted and the variables used in the relational expression may be determined so that the sum of the distance between the plot and the curve or the straight line is maximum value or minimum value.

Also, the error L and the similarity S may be machine-learned to determine whether the display unevenness is acceptable or not. For example, the relationship between the error L and the similarity S and the probability that the display unevenness is acceptable is machine-learned. In this case, the machine learning is performed so that the accuracy of determining whether display unevenness is acceptable or not is high. The relational expression may be a boundary consisting of plots of the image data whose probability is a predetermined threshold or more (or is the predetermined threshold or less), or a machine-learned classifier.

Further, machine learning classification methods include logistic regression, decision trees, k-nearest neighbors algorithm, support vector machines, random forests, or neural networks, etc. . . .

Second Embodiment

The parts in the second embodiment that differ from the first embodiment will be explained mainly, and similar parts will be omitted. As shown in FIG. 10, the information processing device 11 of the information processing system 100 in the second embodiment includes the determination unit 2A and the processing unit 3. Further, since the training unit 12A has the same function as the data generating unit 2a, the information processing device 11 of the information processing system 100 in the second embodiment does not have the data generating unit 2a.

The functions of the information processing device 1 in the second embodiment are limited as compared with the information processing device 1 in the first embodiment. The information processing device 1 in the second embodiment stores an application that outputs the image data acquired from the measuring unit 10 to the information processing device 11. That is, the information processing device 1 in the second embodiment has a function of outputting the image data to the information processing device 11. Also, the information processing device 1 in the second embodiment has a function of receiving the determination result of whether the display unevenness of the output image data is acceptable or not. That is, in the second embodiment, the information processing device 1 provided at the manufacturing site does not analyze the image data, and the information processing device 11 analyzes the image data. The determination result received by the information processing device 1 is displayed on the monitor of the information processing device 1 (not shown). In the second embodiment, the inspector at the manufacturing site can determine whether the display unevenness of the image data is acceptable or not even if there is no device for analyzing the image data at the manufacturing site. The second embodiment is suitable when the information processing device 1 is located far from the information processing device 11 or, a company that owns the information processing device 1 and a company that owns the information processing device 11 are different.

REFERENCE SIGNS LIST

1: information processing device
2A: determination unit
2B: error calculation unit
2C: Similarity calculation unit
2a: data generating unit
3: the processing unit
4: memory
5: input/output unit
10: measuring unit
11: information processing device
12: calculation unit
12A: training unit
12A1: encoder
12A2: decoder
12B: error calculation unit
12C: similarity calculation unit
12D: acquisition unit
13: memory
14: input/output unit
21: evaluation target monitor
22: image display unit
100: the information processing system
Ar1: region
Ar2: region
Ar3: region
RS: relationship
S: similarity
d1: training input image data
d2: training output image data
dc: compressed data
D1: input image data for acquiring a relationship
D2: output image data for acquiring a relationship
Dc: compressed data
r1: input image data
r2: output image data
rc: compressed data
dref: reference data

The invention claimed is:
1. An information processing method comprising:
an error calculation step of calculating an error between input image data input to an autoencoder and output image data output from the autoencoder;

a similarity calculation step of calculating a similarity between compressed data and reference data based on the compressed data and the reference data,
the compressed data being acquired by compressing the input image data in an encoder of the autoencoder; and
a determination step of determining whether a display unevenness of the input image data is acceptable based on a relationship between the error and the similarity, the relationship corresponding to a relational expression or a table.

2. The method of claim 1, further comprising:
an acquiring step of calculating a plurality of pairs of an error for acquiring the relationship and a similarity for acquiring the relationship by performing first and second steps for each of a plurality of the input image data, and acquiring the relationship based on the error for acquiring the relationship and the similarity for acquiring the relationship,
the first step of calculating the error for acquiring the relationship based on input image data for acquiring the relationship and output image data for acquiring the relationship which is output from the autoencoder, and
the second step of calculating the similarity for acquiring the relationship based on compressed data for acquiring the relationship and the reference data,
the compressed data for acquiring the relationship being acquired by compressing the input image data for acquiring the relationship in the encoder of the autoencoder.

3. The method of claim 1, wherein
the autoencoder includes the encoder and a decoder, and
the autoencoder learns with a learning model bringing training output image data output from the decoder closer to training input image data input to the encoder,
the training input image data is data that the display unevenness is acceptable.

4. The method of claim 3, wherein
the reference data is based on data acquired by compressing the training input image data in the encoder, and
in the similarity calculation step, the similarity based on an inner product of the compressed data and the reference data is acquired.

5. A non-transitory computer readable medium that stores a computer program causing a computer to execute an information processing, the information processing comprising:
an error calculation step of calculating an error between input image data input to an autoencoder and output image data output from the autoencoder;
a similarity calculation step of calculating a similarity between compressed data and reference data based on the compressed data and the reference data,
the compressed data being acquired by compressing the input image data in an encoder of the autoencoder; and
a determination step of determining whether a display unevenness of the input image data is acceptable based on a relationship between the error and the similarity, the relationship corresponding to a relational expression or a table.

* * * * *